Patented Aug. 22, 1939

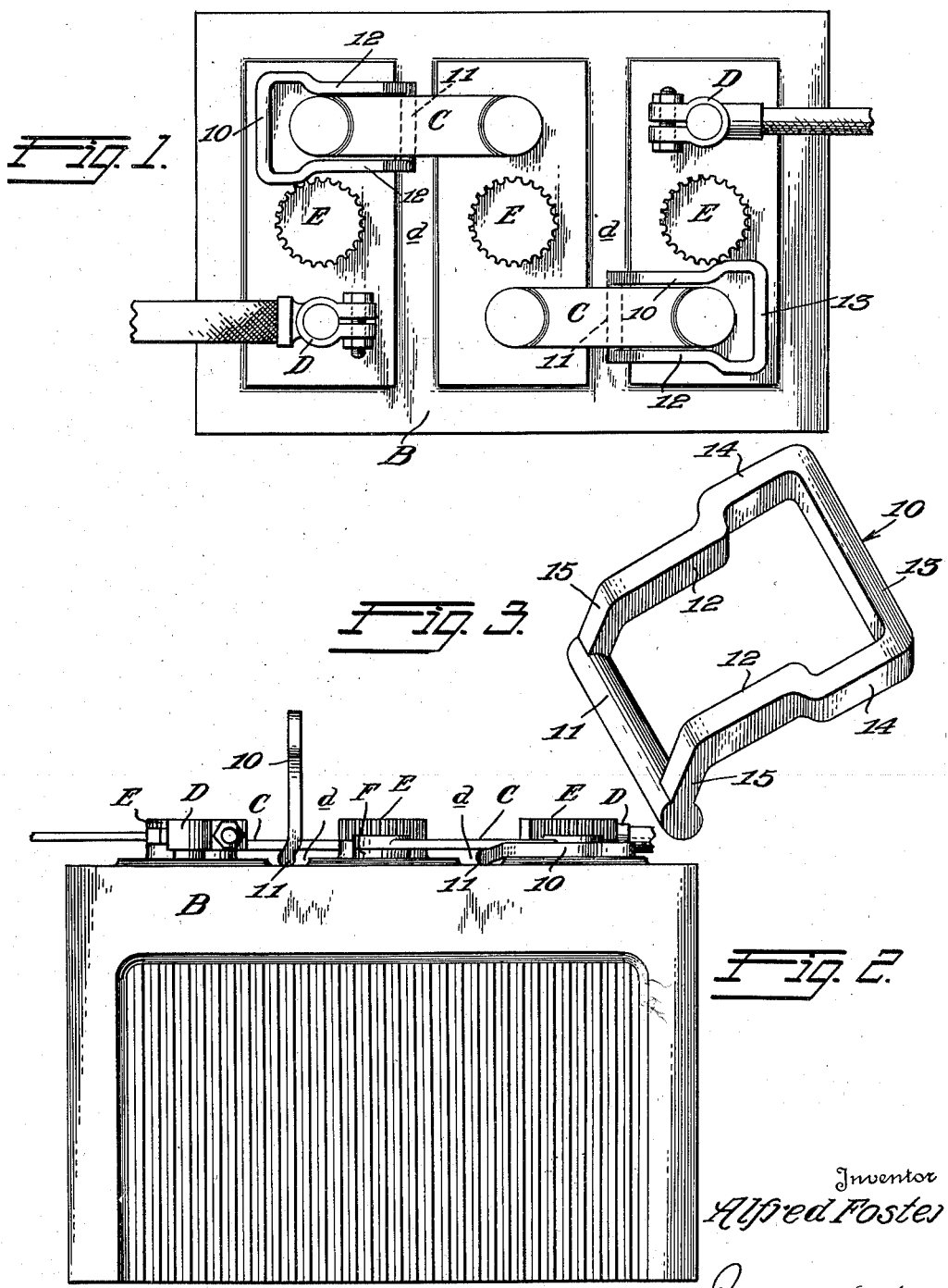

2,170,750

UNITED STATES PATENT OFFICE 2,170,750

HANDLE OR LIFTING DEVICE FOR STORAGE BATTERIES

Alfred Foster, New York, N. Y., assignor to Royal Battery Corporation, New Brunswick, N. J., a corporation of New Jersey Application February 15, 1938, Serial No. 190,648

4 Claims. (Cl. 136—181)

This invention relates to handles or lifting devices for storage batteries.

As is well known, storage batteries are supported in metal casings installed in more or less accessible places on motor vehicles, the casings being in most instances of a height substantially equal to that of the batteries and of a size to snugly receive the same.

Furthermore, storage batteries, while including certain structural projections such as the cable clamps and posts, intercell connectors, filler opening closing caps, etc., nevertheless none of such projections provides a convenient grip or hand hold, and as the battery is surrounded by the casing lifting of same from the casing is very difficult and in fact without proper tools is almost impossible.

While the battery may be grasped by the external side walls in positioning same within the casing, still it is very difficult to completely lower the battery into the casing without injury to the workman's fingers or allowing the battery to drop of its own weight, with the resulting possibility of damage to the battery or the enclosing casing.

It is recognized that means have recently been provided in connection with certain storage batteries to facilitate handling thereof, such means consisting of ledges moulded as a part of the battery case and having finger holes for lifting the batteries, but such constructions not only rob the case of maximum cell space but, due to the fact that the finger holes are on the ends of the batteries, it is difficult to manipulate the batteries with respect to their supporting casings without attendant danger of injury to the fingers.

A primary object of this invention is the provision of handles or lifting devices which are applicable to the various standard storage batteries and which provide for lifting batteries from the tops thereof without any attendant danger of injury to the hands, batteries, or battery supporting casings.

A further object of the invention is the provision of handles or lifting devices for storage batteries which are readily accessible, and when not in use do not increase the over-all dimensions of the batteries.

A still further object of the invention is the provision of handles or lifting devices for storage batteries which are simple in construction, capable of expeditious and easy assembly, and which may be sold and installed at relatively low cost.

For a more complete understanding of the nature and objects of the invention, reference should be had to the following detailed description taken in connection with the accompanying drawing, in which:

Figure 1 is a top plan view of a standard make storage battery illustrating the application of my invention thereto.

Fig. 2 is a side elevational view of the structure illustrated in Fig. 1.

Fig. 3 is a perspective view of a handle or lifting device forming the subject-matter of the present invention in a preferred embodiment thereof.

Referring to the drawing by reference characters, and wherein like characters designate like parts, B designates a storage battery which may be of any standard form and which externally thereof comprises the intercell connectors C, cable binding clamps D, filler opening caps E, and post bus bars F.

The present invention comprises lifting handles 10, one of which is illustrated in perspective in Fig. 3 and two of which are adapted for assembly with a battery, as is clearly indicated in Figs. 1 and 2.

The handles or lifting devices 10 each comprise a cylindrical pivot bar 11 rigid with and preferably integral with the opposite ends of which are parallel side bars 12 at right angles to bar 11 and interconnected at their outer ends by a bar 13 parallel with the bar 11. The side bars 12 are outwardly offset at 14 for providing a finger-engaging loop of convenient length and the bars 12 adjacent bar 11 are inclined upwardly at 15 for a purpose later described.

The handles or lifting devices 10 are preferably formed as castings or stampings and are constructed from a metal having suitable physical strength and chemical resisting properties. For lead storage batteries, an antimonial lead casting has proven highly satisfactory.

The handles 10 are assembled with a battery by inserting the intercell connectors C through the handles and thereafter welding (lead burning) the connectors C to the battery post bus bars F, which is the usual practice in assembling the connectors in the manufacture of storage batteries.

As thus assembled, the handles 10 are disposed as illustrated in Figs. 1 and 2 with the pivot bars 11 disposed beneath the intercell connectors C and resting in the usual depressions d in the top of the battery case. This arrangement of the handles provides a pivotal connection through the bars 11 and thus permits the handles to be raised, as indicated at the left in Fig. 2, whereby when both handles are thus raised they may be grasped within the enlarged loop portions thereof for manipulating the battery with respect to its supporting casing or for transportation thereof.

When the handles are not in use they are folded down, as indicated in Fig. 1 and at the right in Fig. 2, with the side bars 12 disposed on opposite sides of the connectors C, and the inclined portions 15 permit such side bars to lie flat on the top of the battery case and below other projecting portions on the top of the case.

While different makes of batteries may vary as respects the depressions d and the thickness of the connectors C and the spacing thereof from the top of the case, still the connectors may readily be notched or drilled to receive the pivot bars 11, it being essential only that such bars engage beneath the connectors for pivotal movement with respect thereto.

The handles as thus assembled with a storage battery provide a readily accessible means for manipulating the battery without any attendant danger of injury to the hands and, while being always available for use, they are completely out of the way when folded down on the battery case, as illustrated.

These handles are applicable to the various makes of storage batteries and may in fact be installed on batteries already provided with end finger holes to avoid the above noted objections thereto.

The handles when assembled are a unitary part of the battery whereby they cannot become lost or misplaced, as is common with many accessory devices.

While I have disclosed but a single specific embodiment of my invention, nevertheless the same is to be considered as illustrative only and not restrictive, the scope of the invention being defined in the sub-joined claims.

What I claim and desire to secure by Letters Patent is:

1. In combination with a storage battery including a pair of intercell connectors; a handle individual to each connector, the handles having pivotal connection with the connectors and normally lying parallel therewith and below the upper surfaces thereof, the handles being capable of projection from the battery through the pivotal connections for providing hand holes in lifting the battery.

2. The structure defined in claim 1, wherein each handle is of substantially open rectangular formation, embodying a pivot bar at one end thereof and being laterally offset at the opposite end for providing a relatively long finger receiving loop.

3. In combination with a storage battery of the multicell type having exposed intercell connectors; a handle or lifting device individual to each connector, each handle comprising a closed loop having a cylindrical bar pivotally engaged beneath the respective connector and including parallel side bars for normally engaging the top of the battery on opposite sides of the connector, the handles providing convenient gripping means upon projection thereof from the top of the battery when swung outwardly upon their pivotal connections.

4. The structure defined in claim 3, wherein the battery is provided with depressions in the top thereof beneath the intercell connectors, and wherein the cylindrical bars are engaged in the depressions and the side bars are upwardly inclined adjacent the cylindrical bars for parallelism of same with the intercell connectors when normally engaging the top of the battery.

ALFRED FOSTER.